UNITED STATES PATENT OFFICE.

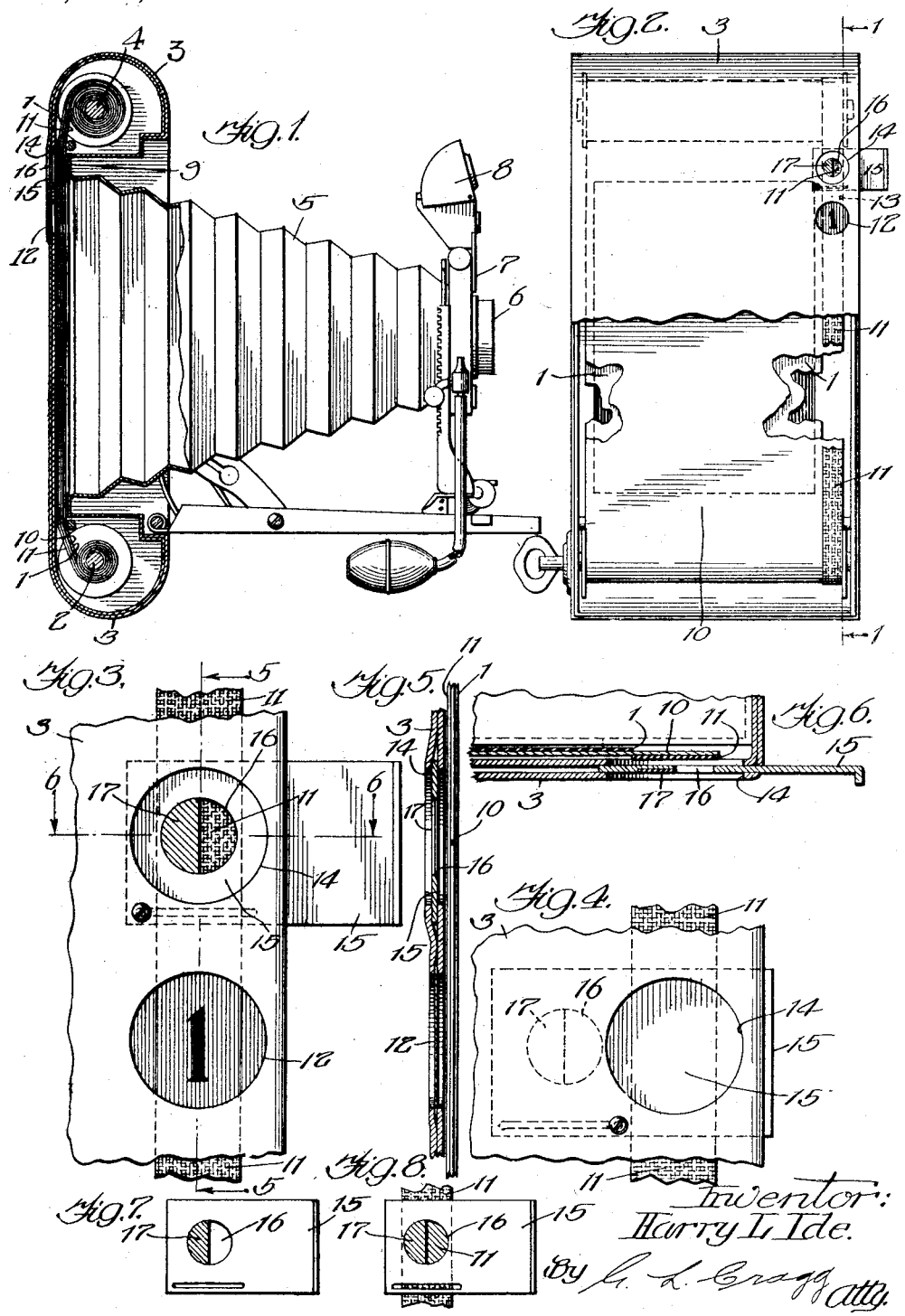

HARRY L. IDE, OF SPRINGFIELD, ILLINOIS, ASSIGNOR OF ONE-HALF TO ROY W. IDE, OF SPRINGFIELD, ILLINOIS.

PHOTOGRAPHIC CAMERA.

1,208,320.      Specification of Letters Patent.      Patented Dec. 12, 1916.

Application filed October 23, 1915. Serial No. 57,404.

*To all whom it may concern:*

Be it known that I, HARRY L. IDE, citizen of the United States, residing at Springfield, in the county of Sangamon and State of Illinois, have invented a certain new and useful Improvement in Photographic Cameras, of which the following is a full, clear, concise, and exact description, reference being had to the accompanying drawings, forming a part of this specification.

My invention relates to photographic cameras and, in one of its features, resides in providing an opening in or place on the camera casing at which an actinic light value testing portion may be placed and a portion of fixed tint margining said opening for comparison with a changing tint of the testing portion when exposed to the action of light, there being such a testing portion coupled with a negative producing element.

In accordance with another feature of my invention I provide a sensitized actinic light value testing portion preferably of ribbon form and this sensitized testing portion, whether of ribbon or other form, is located at one side of the negative producing element, though I do not wish to be limited to this latter characteristic when a testing portion of ribbon form is employed.

I will explain my invention more fully by reference to the accompanying drawings showing the preferred embodiment thereof and in which—

Figure 1 is a view of a camera, constructed in accordance with my invention, in vertical elevation, partially in section on line 1 1 of Fig. 2; Fig. 2 is a rear view of the camera structure appearing in Fig. 1, parts being broken away; Fig. 3 is a view illustrating the testing ribbon as having been freshly exposed to the light whose actinic value is to be determined; Fig. 4 is a view illustrating the closure of the opening by which light may have access to the testing element; Fig. 5 is a sectional view on line 5 5 of Fig. 3; Fig. 6 is a sectional view on line 6 6 of Fig. 3; Fig. 7 shows a slide that enters into the preferred construction; Fig. 8 shows the slide of Fig. 7 with an underlying portion of the testing ribbon illustrating the condition of this ribbon after its full exposure.

Like parts are indicated by similar characters of reference throughout the different figures.

My invention is of particular service in connection with the camera illustrated but it is obvious to those skilled in the art that the invention is not to be limited to the type of camera shown.

The sensitized elements that are to form the photographic negatives are embodied in a flexible element 1 commonly called a film which is supplied to the user on a supply spool 2 that is removably inserted in the lower end of the camera casing 3 and from which supply spool the film is led to the winding or receiving spool 4. In the form of camera selected for the purpose of illustrating the invention there is included a bellowslike element 5 which tapers to its forward end at which it is connected with the camera "front" that is provided with the usual lens (of which the frame 6 is shown), the shutter, of which finger lever 7 is shown, and finder 8, all as is well understood by those familiar with the art. The rear of the bellowslike element 5, as is well known, is attached to the border portion 9 of the casing 3 and defines, with the border portion 9, the extent of the area of the film which is to be exposed to the light in photographic operation.

A so-called film comprises a thin piece of sheet celluloid coated upon the side thereof that is to face the lens with a sensitized coating which is to respond to light exposure in the production of photographic negatives. The film is backed by a sheet or tape of paper 10 which is of such a color, say black, or has a combination of colors, to prevent the light from striking through the film to the front or sensitized surface thereof. The ribbons or sheets 1 and 10 are wound together upon the supply spool 2 and are wound together from the supply spool upon the winding spool 4, all as is well known by those familiar with the art.

Each film is of such length as to furnish a number of negatives in the type of camera illustrated, but to which characteristic this invention is not to be limited. As the invention is preferably practised the sensitized portions that are individual to the negative producing portions of the film 1 are merged to form a single ribbon 11 which may be anchored (as by some suitable adhesive material) at its ends upon the outer side of the backing paper 10 but may be unattached at other places to the backing paper. The film 1 is narrower than the backing paper 10, the width of the testing ribbon 11 being desirably equal to the difference between the width of the film and backing paper. The testing ribbon is desirably just as thick as the film, the testing ribbon filling the space beneath the backing paper that is unoccupied by the film, considering the wound portion of the supply spool, the backing strip, film and testing ribbon making a solid compact mass where they are wound upon the supply spool and, for that matter, also where they are wound upon the receiving or winding spool, as will be readily understood. Thus the sensitized testing ribbon is located to one side of the film where it will not interfere with or mar the photographic operation.

The numerals or characters which are successively presented beneath the opening 12 in the back of the camera (usually covered by a ruby colored transparent closure) and which characters number or designate the negative producing portions of the films and of which characters the character 1 appears on the drawing, are desirably located upon the testing ribbon so as not to be superposed upon that portion of the backing strip 10 that overlies the film 1 whereby these designating characters do not interfere with the proper photographic operation and do not mar the negatives resulting from such operation. I also desirably dispose the shearing marks 13, along which the film may be cut when the negatives are to be individually developed, upon the testing ribbon 11 for the same purpose. I have indicated the designating characters 1, etc., and the shearing marks 13 as being printed upon the testing ribbon but I do not wish to be limited to the manner in which these indicating characters are formed.

In practising my invention I have employed a sensitized ribbon 11 which is initially a definite shade of yellow and which, in changing its tints, will assume a greenish tint. A paper similar to that which occurs in the exposure meters furnished by Adams & Co., 24 Charing road, London, may be employed for the testing ribbon 11 if desired.

When a camera is constructed to embrace all of the characteristics of my invention the ribbon 11 is disposed at one side of the camera casing so as to move not only beneath the opening 12, also located at one side of the camera casing, but also beneath an opening 14 located near the opening 12. A light shutter, which preferably slides, is exposed between the part of the camera casing that has the opening 14 and the testing ribbon 11. The slide 15 has a semi-circular opening 16 therein which is margined by a standard or fixed tint 17 which is of a greenish hue to which the portion of the testing ribbon that is exposed to light should turn in testing actinic light value. Normally the slide 15 is in its innermost position so as to close the opening 14. In order to make the test the slide is withdrawn until the opening 16 comes into register with the opening 14 to expose a part of the ribbon 11 that underlies the slide, this exposure being continued until the exposed part of the testing ribbon 11 turns to tint that matches the fixed or standard tint 17. After this testing operation the slide is pushed inwardly and the picture is taken if desired. If the picture is not taken after this test the film together with the testing ribbon may be slightly wound to bring a new testing portion beneath the opening 14 whereupon a new test may be made. If the user should find, on newly opening the slide 15, that a test was previously made he may infer that a picture was taken without winding the exposed area of the film upon the winding or receiving spool and the photographer will therefore wind the previously exposed negative element upon the winding spool before effecting a new test. The number of seconds or minutes or divisions thereof required to bring the tint of the changeable tint sensitized ribbon 11 to be the same as the tint of the standard tint 17 measures the actinic light value and the duration of the picture taking exposure is governed according to this value so determined in the testing operation and also according to the size of the lens aperture which is selected in the photographic operation, as will be well understood by those familiar with the art, there being devices upon the market which will guide the user in determining the duration of exposure with differing sizes of lens openings after the actinic light value has been determined as herein set forth and the calculating device if desired may be mounted upon the camera casing 3 for the sake of convenience.

The portion 17 of standard tint is associated with the testing ribbon 11 for the sake of convenience but I do not wish to be limited to the employment of this portion upon the camera nor to the location of this portion of standard tint upon the camera casing.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A photographic camera including a negative producing element; a sensitized testing portion coupled therewith for testing actinic light value, there being an opening in the camera casing at which the testing portion may be placed to be acted upon by light; and a portion of fixed tint margining said opening for comparison with the changing tint of the testing portion when exposed to the action of light.

2. A photographic camera including a negative producing element; and a sensitized testing portion of ribbon form coupled therewith for testing actinic light value, there being an opening in the camera casing at which the testing portion may be placed to be acted upon by light.

3. A photographic camera including a negative producing element; and a sensitized testing portion coupled therewith at one side thereof for testing actinic light value, there being an opening in the camera casing at which the testing portion may be placed to be acted upon by light.

4. A photographic camera including a negative producing element; a sensitized testing portion coupled therewith for testing actinic light value; and a portion of fixed tint provided upon the part of the camera that carries the negative element for comparison with the changing tint of the testing portion when exposed to the action of light.

In witness whereof, I hereunto subscribe my name this twenty-first day of October A. D., 1915.

HARRY L. IDE.

Witnesses:
G. L. CRAGG,
ETTA L. WHITE.

Copies of this patent may be obtained for five cents each, by addressing the "Commissioner of Patents, Washington, D. C."